(12) United States Patent
Govindillam K et al.

(10) Patent No.: US 10,839,401 B2
(45) Date of Patent: Nov. 17, 2020

(54) APPARATUS AND METHOD FOR QUALIFYING DATA AUTOMATICALLY GENERATED FROM AN UNQUALIFIED SYSTEM

(71) Applicant: Honeywell International Inc., Morris Plains, NJ (US)

(72) Inventors: Sreenivasan Govindillam K, Bengaluru (IN); Kalimulla Khan, Bangalore (IN); Jagannadha Rao Poluri, Bangalore (IN); Sreekumar Thekkuttu Pisharam, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 366 days.

(21) Appl. No.: 15/448,675

(22) Filed: Mar. 3, 2017

(65) Prior Publication Data

US 2018/0211261 A1 Jul. 26, 2018

(30) Foreign Application Priority Data

Jan. 20, 2017 (IN) .............................. 201741002280

(51) Int. Cl.
*G06Q 30/00* (2012.01)
*G07C 5/00* (2006.01)
(Continued)

(52) U.S. Cl.
CPC ........... *G06Q 30/018* (2013.01); *B64D 43/00* (2013.01); *B64D 45/00* (2013.01); *G07C 5/008* (2013.01)

(58) Field of Classification Search
CPC ...... G06Q 30/018; G07C 5/008; B64D 43/00; B64D 45/00
See application file for complete search history.

(56) References Cited

U.S. PATENT DOCUMENTS 8,694,328 B1 * 4/2014 Gormley ............ G06Q 30/0621
705/1.1
8,881,294 B2 11/2014 Johnson et al.
(Continued)

FOREIGN PATENT DOCUMENTS

CN 103574836 2/2014
CN 105329069 2/2016
(Continued)

OTHER PUBLICATIONS

International Searching Authority, "International Search Report and the Written Opinion for PCT/CN2017/071814", "Foreign Counterpart to U.S. Appl. No. 15/541,258", dated Oct. 26, 2017, pp. 1-11, Published in: WO.
(Continued)

*Primary Examiner* — Sze-Hon Kong
(74) *Attorney, Agent, or Firm* — Bookoff McAndrews, PLLC

(57) ABSTRACT

In one embodiment, a method is provided. The method comprises: receiving data, automatically generated in an unqualified system, configured to at least one of: control a vehicle management system in a vehicle, and obtain data from the vehicle management system; verifying integrity of the data; if the integrity of the data is verified, then qualifying the data; and if the data is qualified, then providing data to at least one qualified system in the vehicle management system.

20 Claims, 5 Drawing Sheets

(51) Int. Cl.
*B64D 43/00* (2006.01)
*B64D 45/00* (2006.01)

(56) References Cited

U.S. PATENT DOCUMENTS

| | | | | |
|---|---|---|---|---|
| 9,141,830 | B2 * | 9/2015 | Uczekaj | H04L 67/12 |
| 9,284,045 | B1 * | 3/2016 | Springer | G08G 5/003 |
| 2010/0150122 | A1 * | 6/2010 | Berger | H04W 4/90 |
| | | | | 370/338 |
| 2011/0010435 | A1 * | 1/2011 | Okaya | H04N 5/765 |
| | | | | 709/219 |
| 2011/0081285 | A1 | 4/2011 | Vij | |
| 2013/0212659 | A1 * | 8/2013 | Maher | H04L 63/06 |
| | | | | 726/6 |
| 2013/0305391 | A1 * | 11/2013 | Haukom | G06F 21/84 |
| | | | | 726/29 |
| 2014/0129047 | A1 * | 5/2014 | Barrett | G07C 5/00 |
| | | | | 701/1 |
| 2014/0148977 | A1 * | 5/2014 | Agnihotri | G05B 19/0426 |
| | | | | 701/3 |
| 2014/0180507 | A1 * | 6/2014 | Geay | G01C 23/00 |
| | | | | 701/3 |
| 2015/0019862 | A1 * | 1/2015 | Uczekaj | H04L 63/0884 |
| | | | | 713/155 |
| 2015/0046022 | A1 * | 2/2015 | Bai | G07C 5/008 |
| | | | | 701/31.5 |
| 2015/0058929 | A1 * | 2/2015 | Ayyagari | H04L 63/10 |
| | | | | 726/3 |
| 2015/0074424 | A1 * | 3/2015 | Uczekaj | H04L 67/12 |
| | | | | 713/189 |
| 2015/0150095 | A1 | 5/2015 | Mere et al. | |
| 2016/0200455 | A1 * | 7/2016 | Gadgil | G05B 19/042 |
| | | | | 701/14 |
| 2016/0232725 | A1 * | 8/2016 | Plowman | G06Q 50/30 |
| 2016/0280371 | A1 | 9/2016 | Canavor et al. | |
| 2016/0344747 | A1 * | 11/2016 | Link, II | H04L 63/123 |
| 2017/0004407 | A1 | 1/2017 | Benson et al. | |
| 2017/0127457 | A1 * | 5/2017 | Kwon | H04W 76/10 |
| 2017/0171217 | A1 * | 6/2017 | Osterwise | H04L 63/105 |
| 2017/0187707 | A1 * | 6/2017 | Miu | H04L 63/0823 |
| 2017/0322870 | A1 * | 11/2017 | Hotra | G06F 11/3664 |
| 2018/0044034 | A1 * | 2/2018 | Newman | B64D 45/00 |
| 2018/0164800 | A1 * | 6/2018 | Kaspersky | G05D 1/0016 |
| 2019/0087554 | A1 * | 3/2019 | Fish | G06F 21/32 |

FOREIGN PATENT DOCUMENTS

| | | | |
|---|---|---|---|
| EP | 2 375 333 A2 | 10/2011 | |
| GB | 2539185 A * | 12/2016 | G06F 21/44 |
| WO | 2016/172251 A1 | 10/2016 | |

OTHER PUBLICATIONS

Extended European Search Report dated May 30, 2018 in European Application No. 18152431.5.

* cited by examiner

APPARATUS AND METHOD FOR QUALIFYING DATA AUTOMATICALLY GENERATED FROM AN UNQUALIFIED SYSTEM

CROSS-REFERENCE TO RELATED APPLICATION

This application claims the benefit of Indian Provisional Patent Application Ser. No. 201741002280, filed Jan. 20, 2017, which is incorporated herein by reference in its entirety.

BACKGROUND

Avionics functions may be provided by unqualified systems, such as applications running on portable electronic devices. Flight crew, such as pilots, must verify such data to ensure its appropriateness, e.g. prior to presenting the data to certified avionic systems on an aircraft. This distracts the flight crew from its priority of piloting the aircraft. Therefore, there is a need for a system that reduces or eliminates such distractions.

SUMMARY

In one embodiment, a method is provided. The method comprises: receiving data, automatically generated in an unqualified system, configured to at least one of: control a vehicle management system in a vehicle, and obtain data from the vehicle management system; verifying integrity of the data; if the integrity of the data is verified, then qualifying the data; and if the data is qualified, then providing data to at least one qualified system in the vehicle management system.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
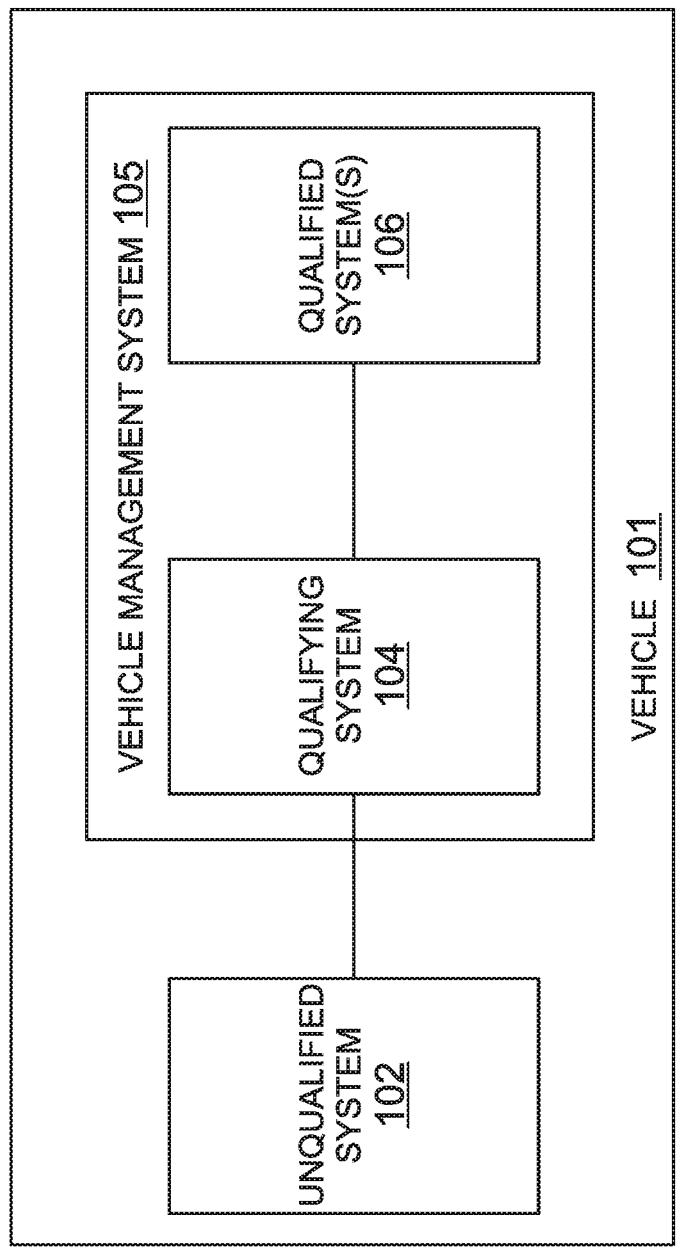
FIG. 1A illustrates a block diagram of an exemplary vehicle including an unqualified system that automatically generates data.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

For pedagogical purposes, a vehicle may be described hereinafter as an aircraft. However, it is understood that the teachings herein are applicable to other types of vehicles including without limitation space craft, ships, automobiles, buses, trains, and any other vehicle. Thus, a pilot of an aircraft is more generically referred to as an operator of a vehicle. An airline is more generically referred to as an owner of a vehicle. A flight plan of an aircraft is more generically referred to as a travel path of the vehicle.

A qualifying system is inserted between an unqualified system, and a qualified system of a vehicle. In one embodiment, one qualifying system qualifies data meant for one or more qualified systems. In another embodiment, two or more qualifying systems each qualify data for different qualified systems. Although two or more qualifying systems may be used, use of only a single qualifying system will be subsequently exemplified in this application. Qualification entails ensuring the integrity and reasonableness of the data provided by the unqualified system.

The qualified system(s) and qualifying system(s) are certified, e.g. by a government authority or other entity. Certification entails ensuring the accuracy and reliability of the system. An unqualified system may provide some of the same or additional functionality but is not qualified. The unqualified system is coupled to the qualified system to provide supplemental or replacement functionality to the qualified system. For example, if the qualified system suffers a disruption or failure in its operation, the unqualified system can provide substitute functionality. Further, the functionality provided by the unqualified system can be modified without having to undergo qualification, e.g. by a government authority or other entity, reducing cost and decreasing the time it takes to release upgraded functionality.

In one embodiment, the unqualified system automatically generates data. In another embodiment, the unqualified system automatically delivers data to a qualified system. Automatic and automatically mean without human intervention. In a further embodiment, the automatic generation of data by the unqualified system is initiated manually, e.g. by the qualified system or another entity such as the operator or owner of vehicle that includes the qualified system. In a further embodiment, the unqualified system receives data from the vehicle describing the status of the vehicle and/or its environment.

The qualifying system verifies, e.g. automatically, integrity and reasonableness of data from the unqualified system. In one embodiment, the qualifying system verifies integrity and reasonableness of data, from the unqualified system, pertaining to the operation of the vehicle. In another embodiment, the qualifying system verifies the integrity by determining whether the data from the unqualified system is corrupted, or not, during transmission. In a further embodiment, the qualifying system verifies reasonableness by determining whether the data is the type of data expected, and that the data is appropriate. In yet another embodiment, the appropriateness of the data is determined by whether the data is in a reasonable range, e.g. not in excess of or below respectively maximum and minimum operating parameters of the vehicle.

For example, the qualifying system can verify that the vector velocity provided by the unqualified system is not in excess of safe, maximum vector velocities of a vehicle. In another example, the qualifying system can verify that the flight plan provided by the unqualified system does not require the vehicle to travel beyond its maximum specified range.

In one embodiment, the qualifying system is proximate to the qualified system, e.g. being located in a vehicle with the qualified system. The unqualified system, however, can be located within or outside the vehicle.

FIG. 1A illustrates a block diagram of an exemplary vehicle 101 including an unqualified system 102 that automatically generates data. The vehicle 101 includes the unqualified system 102, a qualifying system 104, and at least one qualified system 106. The qualifying system 104 is coupled in between the unqualified system 102 and the at least one qualified system 106. In another embodiment, the qualifying system 104 and the at least one qualified system 106 are part of a single system such as a vehicle management system 105. In a further embodiment, the vehicle management system 105 includes the at least one qualified system 106 that includes without limitation one or more of a certified vehicle communications system, central maintenance system, a vehicle sensor system, and/or control system. The foregoing systems may include without limitation a vehicle management computer, a vehicle control computer, a vehicle central maintenance computer, a vehicle sensor system computer, and/or a vehicle communications computer. In yet another embodiment, the unqualified system 102 automatically generates data that is, e.g. automatically, provided to the vehicle management system. In yet a further embodiment, the qualifying system 104 in the vehicle 101, e.g. automatically, qualifies data that is, e.g. automatically, provided to the at least one qualified system 106. In yet another embodiment, the data automatically generated by unqualified system 102 is used to (a) control the vehicle 101 and/or (b) request data, e.g. from the vehicle management system 105, such as from the communications, central maintenance, control and/or sensor systems.

Alternatively, however, in a further embodiment, the qualifying system 104 and the at least one qualified system 106 are not part of the same system, e.g. the vehicle management system 105. In yet another embodiment, the unqualified system 102 is coupled to the single system, e.g. vehicle management system 105, or the qualifying system 104 by an infrared, IEEE802.11 standard compliant, Bluetooth, and/or any other type of communications link, including transceiver and antenna as appropriate.

Figure 1B:
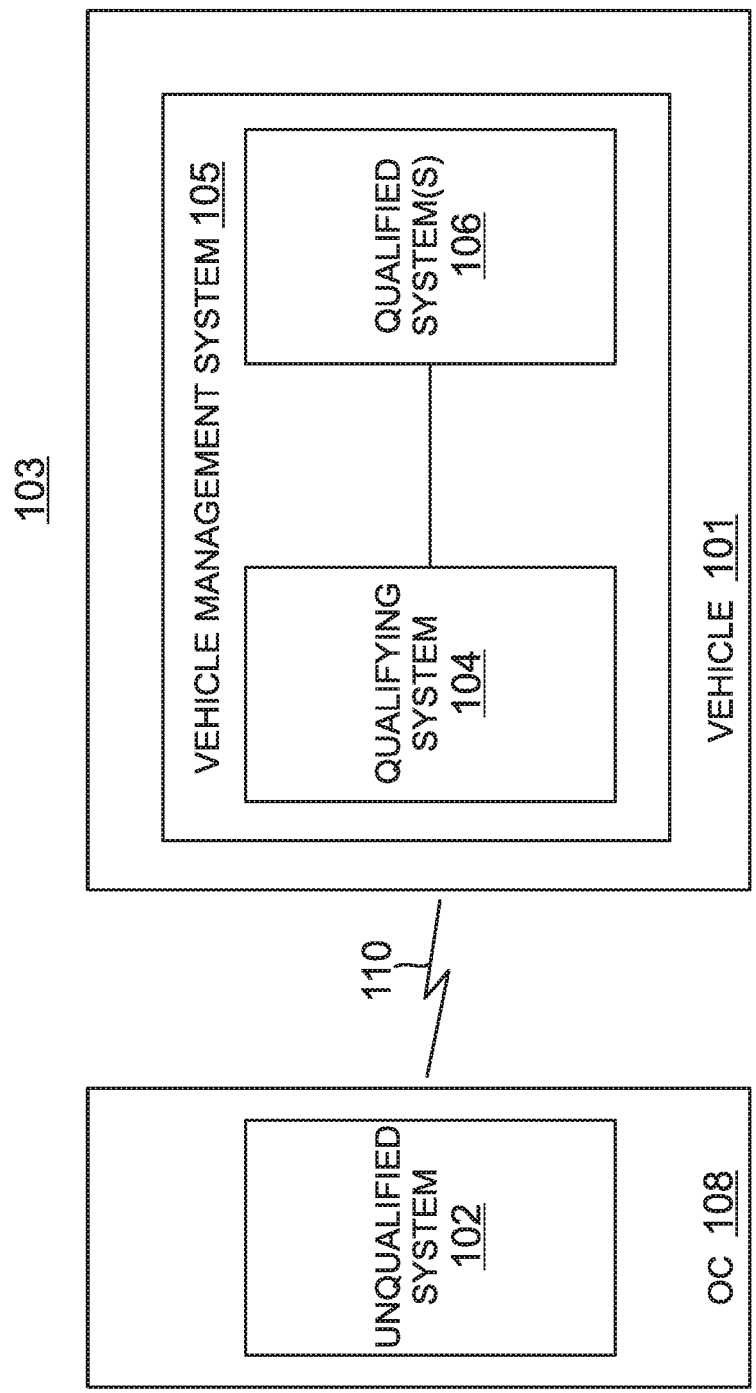
FIG. 1B illustrates a block diagram of an exemplary system including a vehicle and an operating center that automatically generates data.

FIG. 1B illustrates a block diagram of an exemplary system 103 including a vehicle 101 and an operations center 108 that automatically generates data 102. The vehicle 101 includes the qualifying system 104, and at least one qualified system 106. The operations center 108 includes an unqualified system 102, and is located remotely from the vehicle 101. The qualifying system 104 is coupled in between the unqualified system 102 and the at least one qualified system 106. In one embodiment, the operations center 108 is coupled to the vehicle 101, and hence the qualifying system 104, by a communications link 110, such as a HF, VHF, satellite, or any other type of communications link. In another embodiment, the operations center 108 is a cloud computing center.

Figure 2:
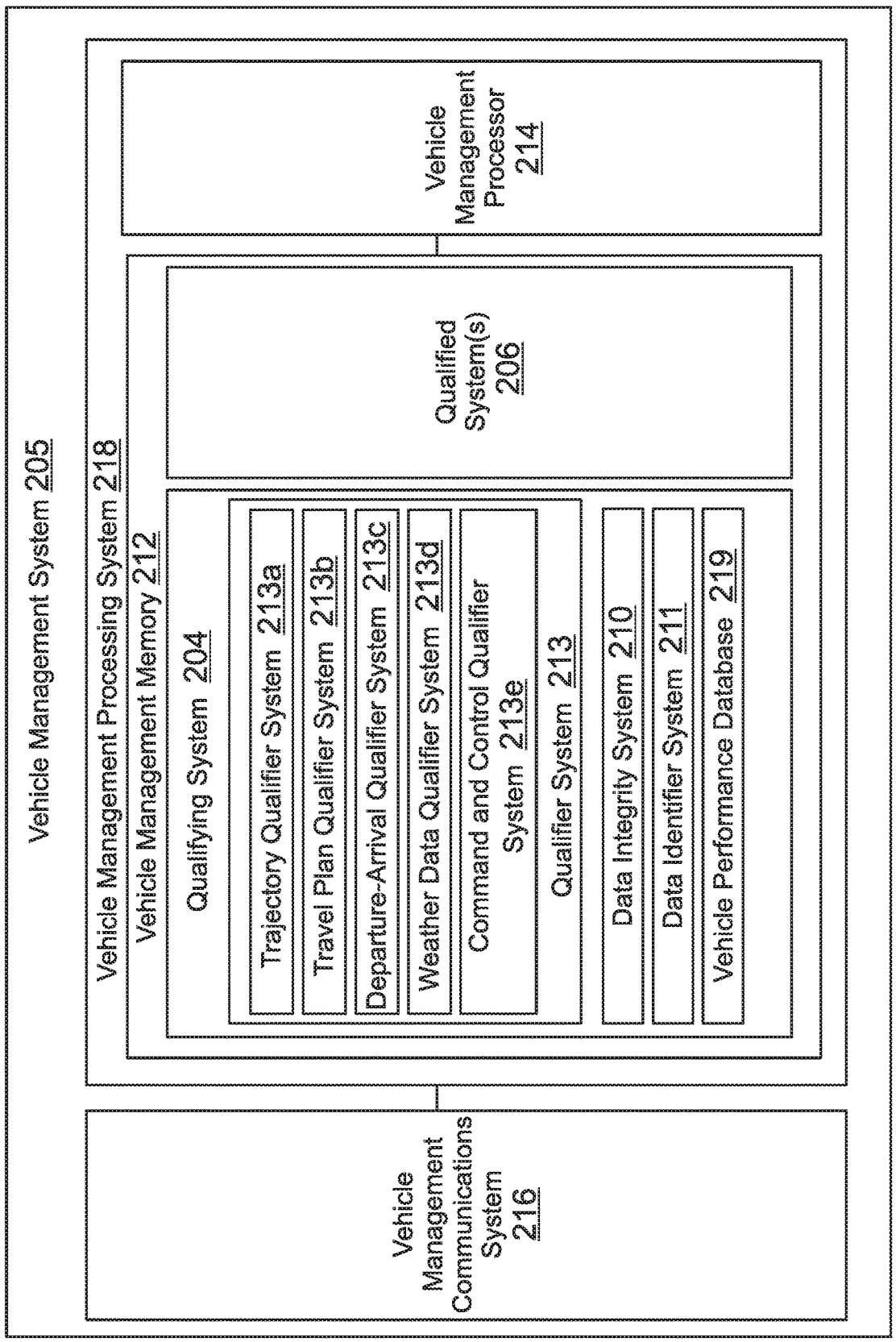
FIG. 2 illustrates a block diagram of an exemplary vehicle management system configured to receive automatically generated data from an unqualified system.

FIG. 2 illustrates a block diagram of an exemplary vehicle management system 205 configured to receive automatically generated data from the unqualified system 102. The vehicle management system 205 includes a vehicle management communications system 216 coupled to a vehicle management processing system 218. The vehicle management communications system 216 includes an infrared, Bluetooth, IEEE802.11 compliant, Wi-Max, cellular, satellite, HF, VHF and/or any other type communications system, including transceiver and antenna as appropriate. In one embodiment, the vehicle management communications system 216 facilitates transmission of data from the qualifying system 204, e.g. a data integrity system 210 and possibly a data identifier system 211, to the unqualified system 102.

In one embodiment, the vehicle management processing system 218 includes a vehicle management memory 212 coupled to a vehicle management processor 214. Alternatively, however, the vehicle management processing system 218 can be otherwise implemented, e.g. with a state machine or a field programmable gate array.

In one embodiment, the vehicle management memory 212 includes a qualifying system 204 and at least one qualified system 206. In another embodiment, the qualifying system 204 includes at least one qualifier system (qualifier system) 213 and the data integrity system 210. In another embodiment, the qualifying system 204 includes the data identifier system 211. In a further embodiment, the vehicle management memory 212 includes a vehicle performance database 219 which may be stored in the format of a database, data file, or any other format. However, the vehicle performance database 218 may be stored elsewhere, e.g. in another system. In yet another embodiment, the at least one qualified system 206, the at least one qualifier system 213, the data integrity system 210, the data identifier system 211, and the vehicle performance database 219 are a mixture of data, e.g. stored in databases, files and/or other formats, and/or executable software that are processed on the vehicle management processor 214.

The data integrity system 210 receives and evaluates whether the automatically generated data received from the unqualified system 102 has errors induced by the transmitter, receiver and/or communications channel. In one embodiment, the automatically generated data is encoded using systematic cyclic codes, and the data integrity system 210 performs a cyclic redundancy check (CRC) to determine if there are such errors. If no errors are identified, the automatically generated data is transmitted or conveyed to the data identifier system 211.

The data identifier system 211 identifies, e.g. automatically, type of automatically generated data being qualified. In one embodiment, the data from the unqualified system 102 includes a data type identifier, e.g. a parameter label and/or data units (such as miles per hour or knots). For example, the data from the unqualified system 102 includes an identifier for each type of data, and the data identifier system 211 uses the identifier to select, e.g. automatically, a specific qualifier system, in the at least one qualifier system 213, to be used to qualify the data. Upon determining the type of data that is being qualified, the data is communicated from the data identifier system 215 to the at least one qualifier system 213.

In one embodiment, the vehicle performance database 219 includes characteristics of the vehicle 101. In another embodiment, the vehicle performance database 208 may be located, e.g. stored, elsewhere such as in the vehicle management processing system 218 or the vehicle 101. The characteristics of the vehicle 100 may include, e.g. for an aircraft, range, gross and empty weight, rate of climb, fuel capacity, maximum speed, fuel burn rate, ground roll at takeoff and landing, and typical indicated airspeed or true airspeed, e.g. at different flight levels.

The at least one qualifier system 213 includes one or more qualifier systems for different types of automatically generated data. In one embodiment, the at least one qualifier system 213 confirms that the automatically generated data, based on the identified data type, being provided to the vehicle 101 comports with the performance capabilities of the vehicle 101, e.g. specified in the vehicle performance database 219, or is otherwise reasonable. In another embodiment, the at least one qualifier system 213 makes such a determination based, at least in part, on historical data, e.g. that it has previously processed and accepted. In a further embodiment, if the automatically generated data is not qualified, then the vehicle management system 205 issues an alert to the vehicle operator(s) requesting their intervention. In yet another embodiment, if the automatically generated data is not qualified, then the vehicle management system 205 issues the alert to the unqualified system 102 that the data is not qualified so that the unqualified system 102 can send data that will be qualified.

In one embodiment, the at least one qualifier system 213 includes qualifier data for different data types, instead of having such information stored in the vehicle performance database 219. Thus, the at least one qualifier system 213, or each specific qualifier system in the qualifier system 213, may include one or more separate data files, databases, or other data storage formats including data that defines a reasonable range for types data, e.g. not found in the vehicle performance database 219 or if there is no vehicle performance database 219.

In one embodiment, the at least one qualifier system 213 includes one or more specific qualifier systems, e.g. at least one of a trajectory qualifier system 213a, a travel plan qualifier system 213b, a departure-arrival qualifier system 213c, a weather data qualifier system 213d, and/or a control and command qualifier system 213d.

In one embodiment, the trajectory qualifier system 213a ensures that the vector velocity and trajectory, e.g. angle of attack, of the vehicle comport with the limitations of the vehicle 101, such as maximum and/or minimum altitude, maximum and/or minimum speed, maximum and/or minimum rate of climb, and/or maximum and/or minimum rate of decent. In another embodiment, such maximum and minimum parameters vary at different states of travel such as departure, cruising, and arrival.

In one embodiment, the travel plan qualifier 213b ensures that a travel plan provided by the unqualified system 102 includes all necessary parameters such as an identifier of the vehicle 101, an expected speed of the vehicle 100, a departure location (or departure terminal) and time, information about travel path (e.g. cruising altitude, travel ways, and checkpoints), and arrival location(s) (or destination(s) or terminal(s)), estimated time en route, fuel on board, alternate arrival locations (or destination(s) or terminal(s)) in case of inclement weather, type of travel (e.g. for aircraft whether instrument flight rules (IFR) or visual flight rules (VFR) apply), information about the operator of the vehicle 101 (e.g. pilot), and number of people on board the vehicle 101. Further the travel plan qualifier 213b determines whether such information comports with the operating parameters of the vehicle 101, e.g. by utilizing the vehicle performance database 219. In another embodiment, the travel plan qualifier 213b estimates an amount of fuel consumed during the travel, and ensures that the travel plan does not cause the vehicle 101 to exceed its fuel carrying capabilities.

In one embodiment, the departure-arrival qualifier system 213c ensures that the departure and arrival travel trajectory parameters provided by the unqualified system 102 comport with the operating parameters of the vehicle 101, e.g. by utilizing the vehicle performance database 208. In another embodiment, the departure-arrival qualifier 213c verifies that the altitude and/or vector velocity of the vehicle 101 during departure and arrival is within limits specified in the vehicle performance database 219.

In one embodiment, the weather data qualifier 213d ensures that wind vector velocity and temperature comport with expectations, e.g. for the altitude at which the vehicle 101 is travelling. The control and command qualifier system 213d ensures that the pitch, roll and yaw are within the performance capabilities of the vehicle 101 as specified in the vehicle performance database 219.

Figure 3:
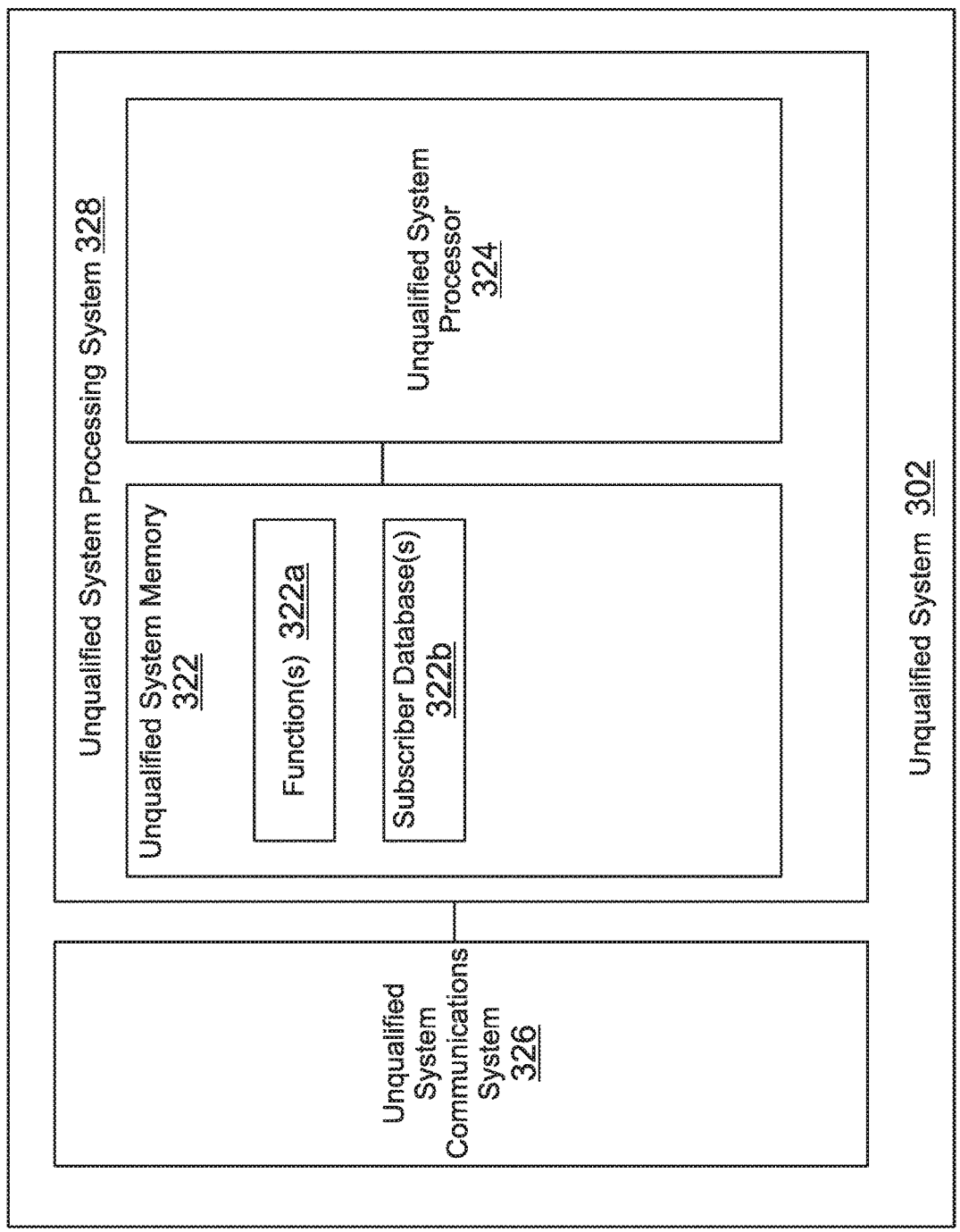
FIG. 3 illustrates a block diagram of an unqualified system that automatically generates data.

FIG. 3 illustrates a block diagram of an exemplary unqualified system that automatically generates data (unqualified system) 302. In one embodiment, the unqualified system 102 comprises a portable electronic device that includes data and executes. In another embodiment, the portable electronic device is a tablet, laptop, smart phone, or any other type of portable electronic device.

In one embodiment, the unqualified system 302 includes an unqualified system communications system 326 coupled to an unqualified system processing system that automatically generates data (unqualified system processing system) 328. In another embodiment, the unqualified system communications system 326 facilitates communicating the data, automatically generated by the unqualified system 302, to the qualifying system 104, e.g. in the vehicle 101 or vehicle management system 105. In a further embodiment, the automatically generated data is communicated over the communications link 110. The unqualified system communications system 326 includes an infrared, Bluetooth, IEEE802.11 compliant, Wi-Max, cellular, satellite, HF, VHF and/or any other type communications system, including transceiver and antenna as appropriate.

In one embodiment, the unqualified system processing system 328 includes an unqualified system processor 324 coupled to an unqualified system memory 322. Alternatively, however, the unqualified system 302 can be otherwise implemented, e.g. with a state machine or a field programmable gate array.

In one embodiment, the unqualified system memory 322 includes at least one function 322a. The at least one function 322a are the one or more functions provided by the unqualified system 302, and which create the automatically generated data. In another embodiment, one of the at least one function 322a is an autopilot system. In a further embodiment, the at least one function 322a may generate or provide control commands (such as departure and arrival speeds), situational awareness data (such as terrain data, other vehicle traffic data, and weather data), fuel efficiency data, communications system control data (such as navigation radio frequencies), and flight profile data such as vehicle speed, altitude, climb and descent rates, and way points. In yet another embodiment, the at least one function 322 is in the format of executable code. In yet a further embodiment, the at least one function 322 is executed on the unqualified system processor 324 to automatically generate data. In another embodiment, the at least one function 322 automatically generates data, at least in part, based upon data received from the unqualified system 102. In a further embodiment, the received data includes information about the status of the vehicle 101 such as vector velocity, geographical location, fuel remaining, and/or weather conditions like wind velocity, temperature and pressure.

In one embodiment, the unqualified system memory 322 includes at least one subscriber database 322b which may be stored in the format of a database, data file, or any other format. The at least one subscriber database 322b includes at least one identifier corresponding to subscriber vehicles, vehicle operators, and/or vehicle owners, such as tail plane numbers for an aircraft.

Figure 4:
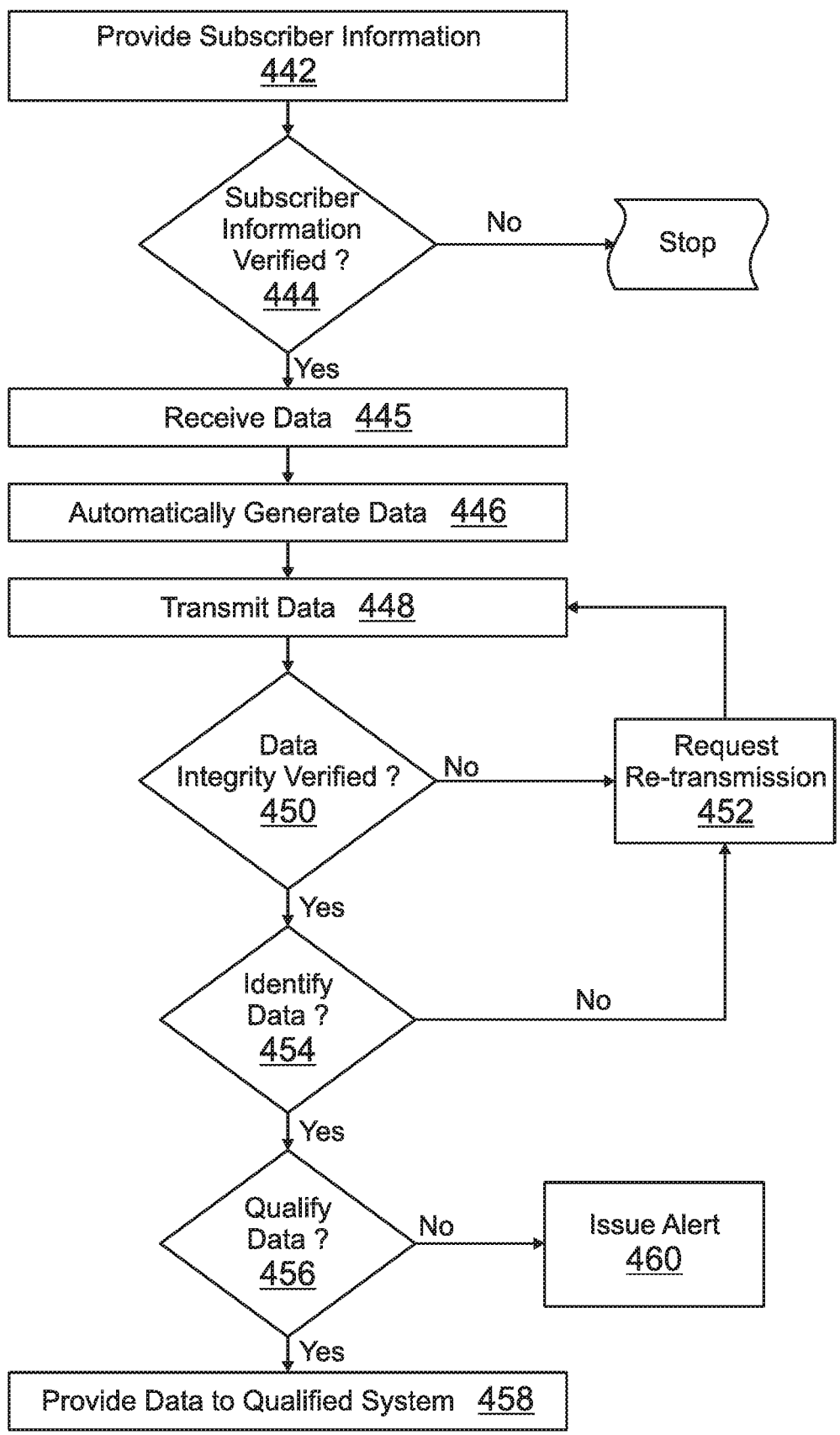
FIG. 4 is an exemplary flow diagram of a method of the operation of a communications network.

FIG. 4 illustrates one embodiment of a method 440 for qualifying data automatically generated from an unqualified system 102. To the extent that the embodiment of method 440 shown in FIG. 4 is described herein as being implemented in the systems shown in FIGS. 1 through 3, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In one embodiment, in block 442, subscriber information is provided, e.g. to the unqualified system 102. In another embodiment, the subscriber information is provided by the vehicle management system 105, the qualifying system 104, or the at least one qualified system 106.

In one embodiment, in block 444, the subscriber information is verified, e.g. by the unqualified system 102. In another embodiment, the unqualified system 102 compares the provided subscriber information with subscriber information in the at least one subscriber database 332b. In a further embodiment, if the subscriber information is not validated, e.g. the requesting vehicle is not verified as a subscriber, the process is halted. If the subscriber information is verified, then in yet another embodiment, proceed to block 445.

In one embodiment, in block 445, data from the at least one qualified system 106 is received by the unqualified system 102. In another embodiment, the received data includes information about the status of the vehicle 101 such as vector velocity, geographical location, fuel remaining, and/or weather conditions like wind velocity, temperature and pressure.

In one embodiment, in block 446, data is automatically generated, e.g. by the unqualified system 102. In another embodiment, the data may be generated using the received data. In a further embodiment, in block 448, transmit or provide the automatically generated data, e.g. to the qualifying system 104.

In one embodiment, in block 450, the integrity of the automatically generated data is verified, e.g. by the data integrity system 210. In another embodiment, if the integrity of the automatically generated data is not verified (or verifiable), then, in block 452, request retransmission of the automatically generated data and return to block 448.

In one embodiment, if the integrity of the automatically generated data is verified, then, in block 454, identify the type of data. In another embodiment, the identification is performed by the data identifier system 211. If the type of data cannot be identified, in a further embodiment then proceed to block 452 and return to block 448. If the type of data can be identified, in yet another embodiment, then proceed to block 456.

In one embodiment, in block 456, qualify the automatically generated data based upon the identified data type. In one embodiment, the qualification is performed by a qualifier system corresponding to the type of data identified in block 454.

In one embodiment, if the automatically generated data is qualified, then, in block 458, provide the automatically qualified data, e.g. to the qualified system. In another embodiment, the qualified system then processes the received automatically generated data.

In one embodiment, if the automatically generated data is not qualified, then in block 460, issue an alert. In another embodiment, the alert, such as a message, is issued to the vehicle operator(s), e.g. through the vehicle management system, requesting the intervention of the vehicle operator(s). In a further embodiment, if the automatically the alert is issued to the unqualified system 102 indicating that the data is not qualified so that the unqualified system 102 can send data that will be qualified. In yet another embodiment, the alert is issued to at least one of the vehicle operator(s) and the unqualified system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a system, comprising: a vehicle comprising a vehicle management system; wherein the vehicle management system comprises a qualifying system coupled to at least one qualified system; wherein the qualifying system is configured to receive data, automatically generated from an unqualified system, which is configured to at least one of: control the vehicle management system and obtain data from the vehicle management system; and wherein the qualifying system is configured to verify integrity and reasonableness of the data received from the unqualified system.

Example 2 includes the system of Example 1, wherein the vehicle further comprises the unqualified system.

Example 3 includes the system Example 2, wherein the unqualified system comprises a portable electronic device.

Example 4 includes the system of any of Examples 2-3, wherein the unqualified system comprises: an unqualified system communications system; and an unqualified system processing system coupled to the unqualified systems communications system.

Example 5 includes the system of Example 4, wherein the unqualified system processing system comprises: an unqualified system processor; an unqualified system memory coupled to the unqualified system processor; and wherein the unqualified system memory comprises at least one function performed by the unqualified system processor.

Example 6 includes the system of Example 5, wherein the unqualified system memory further comprises at least one subscriber database.

Example 7 includes the system of any of Examples 1-6, wherein the vehicle management system further comprises: a vehicle management communications system; a vehicle management processing system coupled to the vehicle management communications system; wherein the vehicle management processing system comprises a vehicle management memory coupled to a vehicle management processor; wherein the vehicle management memory comprises the qualifying system and the at least one qualified system; and wherein the qualifying system and the at least one qualified system are configured to be processed on the vehicle management processor.

Example 8 includes the system of Example 7, wherein the qualifying system comprises a data integrity system and a qualifier system.

Example 9 includes the system of Example 8 wherein the qualifying system comprises a data identifier system.

Example 10 includes the system of any of Examples 8-9 wherein the qualifying system further comprises a vehicle performance database.

Example 11 includes an operations center, comprising: an unqualified systems communications system; an unqualified system processing system coupled to the unqualified systems communications system; wherein the unqualified system is configured to automatically generate data; wherein the unqualified systems communications system is configured to transmit the data to a vehicle including a qualifying system that verifies integrity and reasonableness of the data; and wherein the data is configured to at least one of: control a vehicle management system of the vehicle, and obtain data from the vehicle management system.

Example 12 includes the system of Example 11, wherein the unqualified system processing system comprises: an unqualified system processor; an unqualified system memory coupled to the unqualified system processor; wherein the unqualified system memory comprises at least one function; and wherein the at least one function is configured to be performed by the unqualified system processor.

Example 13 includes the system of Example 12, wherein the unqualified system memory further comprises at least one subscriber database.

Example 14 includes a method, comprising: receiving data, automatically generated in an unqualified system, configured to at least one of: control a vehicle management system in a vehicle, and obtain data from the vehicle management system; verifying integrity of the data; if the integrity of the data is verified, then qualifying the data; and if the data is qualified, then providing data to at least one qualified system in the vehicle management system.

Example 15 includes the method of Example 14, further comprising: identifying type of the data; and wherein qualifying the data comprises if the type of data is identified, then qualifying the data with a qualifying system based upon the type of data identified.

Example 16 includes the method of Example 15, further comprising if the type of data is not identified, then requesting re-transmission of the data.

Example 17 includes the method of any of Examples 14-16, further comprising if the data is not qualified, then issuing an alert.

Example 18 includes the method of Example 17, wherein issuing the alert comprises issuing an alert to at least one of the unqualified system and an operator of the vehicle.

Example 19 includes the method of any of Examples 14-18, further comprising if the integrity of the data is not verified, then requesting retransmission of the data.

Example 20 includes the method of any of Examples 14-19, further comprising: providing subscriber information; and verifying subscriber information.

What is claimed is:

1. A system, comprising:
   an unqualified system that is not certified by a government authority or other entity, the unqualified system being configured to control and obtain data from a vehicle management system; and
   a vehicle management system, comprising:
   one or more qualified systems certified by the government authority or other entity; and
   a qualifying system certified by the government authority or other entity in communication with the one or more qualified systems and the unqualified system, the qualifying system including one or more qualifier systems, each of the one or more qualifier systems corresponding to a different specific type of data that corresponds to a respective one of the one or more qualified systems, wherein each respective qualifier system of the qualifying system is configured to:
   receive, from the unqualified system, data automatically generated by the unqualified system, the data being the specific type of data for the respective qualified system and corresponding to the respective qualifier system;
   verify integrity and reasonableness of the data received from the unqualified system, the reasonableness of the data being determined by whether the data is the specific type of data expected;
   qualify the data received from the unqualified system by the respective qualifier system; and
   provide the qualified data to the respective qualified system.

2. The system of claim 1, wherein the vehicle further includes the unqualified system.

3. The system of claim 2, wherein the unqualified system includes a portable electronic device.

4. The system of claim 2, wherein the unqualified system comprises:
   an unqualified system communications system; and
   an unqualified system processing system coupled to the unqualified system communications system.

5. The system of claim 4, wherein the unqualified system processing system includes:
   an unqualified system processor;
   an unqualified system memory coupled to the unqualified system processor; and
   wherein the unqualified system memory includes at least one function performed by the unqualified system processor.

6. The system of claim 5, wherein the unqualified system memory further includes at least one subscriber database.

7. The system of claim 1, wherein the vehicle management system further includes:
   a vehicle management communications system; and
   a vehicle management processing system coupled to the vehicle management communications system;
   wherein the vehicle management processing system includes a vehicle management memory coupled to a vehicle management processor;
   wherein the vehicle management memory includes the qualifying system and the at least one qualified system; and
   wherein the qualifying system and the at least one qualified system are configured to be processed on the vehicle management processor.

8. The system of claim 7, wherein the qualifying system includes a data integrity system.

9. The system of claim 8, wherein the qualifying system includes a data identifier system.

10. The system of claim 8, wherein the qualifying system further includes a vehicle performance database.

11. An operations center, comprising:
    an unqualified system that is not certified by a government authority or entity, the unqualified system including an unqualified system communications system and an unqualified system processing system coupled to the unqualified system communications system, wherein the unqualified system is configured to:

automatically generate data including different specific types of data;

transmit, by the unqualified system communications system, the automatically generated data to a vehicle including a qualifying system that is certified by the government authority or entity, the qualifying system including one or more qualifier systems each, each of the one or more qualifier systems corresponding to a different specific type of data that corresponds to a respective one of one or more qualified systems onboard the vehicle that is certified by the government authority or other entity, wherein each respective qualifier system of the qualifying system receives the specific type of data for the respective qualified system and corresponding to the respective qualifier system, verifies integrity and reasonableness of the data, the reasonableness of the data being determined by whether the data is the specific type of data expected; and control, using the automatically generated data provided to the respective qualified system, a vehicle management system of the vehicle and obtain data from the vehicle management system.

12. The operations center of claim 11, wherein the unqualified system processing system includes:

an unqualified system processor;

an unqualified system memory coupled to the unqualified system processor;

wherein the unqualified system memory includes at least one function; and wherein the at least one function is configured to be performed by the unqualified system processor.

13. The operations center of claim 12, wherein the unqualified system memory further includes at least one subscriber database.

14. A method, comprising:

receiving, by a respective qualifier system of a qualifying system that is certified by a government authority or other entity and includes one or more qualifier systems, each of the one or more qualifier systems corresponding to a different specific type of data that corresponds to a respective one of one or more qualified systems that is certified by the government authority or other entity, data automatically generated by an unqualified system, the received data being the specific type of data for the respective qualified system and corresponding to the respective qualifier system, the unqualified system not certified by the government authority or other entity and configured to at least one of: control a vehicle management system in a vehicle or obtain data from the vehicle management system;

verifying, by the respective qualifier system of the qualifying system, integrity of the received data by determining whether the received data is corrupted during transmission;

verifying, by the respective qualifier system of the qualifying system, reasonableness of the received data by determining whether the received data is the specific type of data expected;

if the integrity and the reasonableness of the data is verified, then qualifying, by the respective qualifier system of the qualifying system, the received data; and providing, by the respective qualifier system of the qualifying system, the qualified data to respective qualified system in the vehicle management system such that the unqualified system controls the vehicle management system by the qualified data.

15. The method of claim 14, further comprising:

identifying, by the qualifying system, the specific type of data of the received data; and wherein qualifying, by the respective qualifier system of the qualifying system, the received data includes qualifying, by the respective qualifier system of the qualifying system, the received data with at least one of the one or more qualifier systems based upon the specific type of data identified of the received data.

16. The method of claim 15, further comprising if the specific type of data of the received data is not identified, then requesting, by the qualifying system, re-transmission of the data.

17. The method of claim 14, further comprising if the data is not qualified, then issuing, by the qualifying system, an alert.

18. The method of claim 17, wherein issuing, by the qualifying system, the alert includes issuing, by the qualifying system, an alert to at least one of the unqualified system and an operator of the vehicle.

19. The method of claim 14, further comprising if the integrity or the reasonableness of the data is not verified, then requesting, by the qualifying system, re-transmission of the data.

20. The method of claim 14, further comprising:

receiving, by the qualifying system, subscriber information; and verifying, by the qualifying system, the received subscriber information.

* * * * *